United States Patent [19]

Waldmann et al.

[11] 3,755,185
[45] Aug. 28, 1973

[54] ANHYDROUS HYDROGEN PEROXIDE SOLUTIONS

[75] Inventors: Helmut Waldmann, Leverkusen; Wulf Schwerdtel, Koeln; Wolfgang Swodenk, Odenthal-Globusch, all of Germany

[73] Assignee: Bayer Aktiengesellschaft, Leverkusen, Germany

[22] Filed: July 29, 1971

[21] Appl. No.: 167,530

[30] Foreign Application Priority Data
Aug. 1, 1970 Germany.................. P 20 38 320.4

[52] U.S. Cl.................... 252/186, 252/99, 423/272, 423/584
[51] Int. Cl............................................ C01b 15/02
[58] Field of Search............................ 252/186, 99; 423/272, 584; 23/207, 207.5

[56] References Cited
UNITED STATES PATENTS
2,386,484  10/1954  Levitan et al...................... 252/186
3,376,110  4/1968  Shiraeff.............................. 423/272
3,480,557  11/1969  Shiraeff.............................. 252/186

FOREIGN PATENTS OR APPLICATIONS
699,784  12/1964  Canada............................... 423/272
719,199  10/1965  Canada............................... 423/272

*Primary Examiner*—Leon D. Rosdol
*Assistant Examiner*—Irwin Gluck
*Attorney*—Ralph D. Dinklage and Arnold Sprung

[57] ABSTRACT

Anhydrous solutions of hydrogen peroxide, containing about 3 to 60 percent by weight of $H_2O_2$ in a saturated nitrogen heterocyclic compound having 4 to 6 ring members and a carbonyl group adjacent to the nitrogen atom are obtained by adding the heterocyclic compound to an aqueous solution of hydrogen peroxide and removing the water, as by distillation. The heterocyclic compound is a lactam or N-acylated structure, N-methyl-pyrrolidone being preferred.

14 Claims, No Drawings

ANHYDROUS HYDROGEN PEROXIDE SOLUTIONS

The present invention relates to the preparation of novel anhydrous solutions of hydrogen peroxide.

The water content of hydrogen peroxide solutions interferes in various reactions such as in the preparation of percarboxylic acids, so that the $H_2O_2$ is not completely reacted (Org. Reactions 7, 395 (1953)). Although water can be separated from $H_2O_2$ by repeated rectification so that highly concentrated or even anhydrous hydrogen peroxide can be recovered from dilute aqueous solutions, this rectification is accompanied by a certain amount of decomposition of the hydrogen peroxide, and the lower the initial concentration of the aqueous hydrogen peroxide the more decomposition will take place. The more dilute the aqueous hydrogen peroxide solution, the larger will be the amount of impurities present which cause decomposition (U.S. Pat. No. 2,949,343). Moreover, highly concentrated hydrogen peroxide is difficult to handle owing to the risk of explosion (U.S. Pat. No. 2,919,975).

It is accordingly an object of the invention to provide stable substantially anhydrous solutions having moderate concentrations of hydrogen peroxide.

This object is realized by the present invention pursuant to which there are provided stable, practically anhydrous solutions of hydrogen peroxide in saturated nitrogen heterocyclic compounds which have from 4 to 6 ring members and which have a carbonyl group adjacent to the nitrogen hetero atom.

The saturated heterocyclic nitrogen compounds which contain 4, 5 or 6 ring members and a carbonyl group adjacent to the nitrogen atom of which the carbon atom may be either in the ring or outside the ring, may be N-substituted lactams or N-acylated cyclic bases.

Lactams of the following general formula

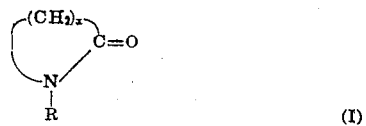

(I)

are mentioned as examples. In formula (I), R represents a straight chain or branched chain $C_1$–$C_4$ alkyl radical which may be substituted with halogen, hydroxyl or a $C_1$–$C_3$ alkoxy group and $x$ denotes the integer 2, 3 or 4.

N-Acyl compounds of the following general formula:

(II)

in which $y$ represents 3, 4 or 5 and R has the meaning already indicated above are also mentioned as examples.

R may represent the following substituted or unsubstituted alkyl radicals: Methyl, ethyl, n-propyl, isopropyl, n-butyl, isobutyl, sec.-butyl, tert.-butyl, chloromethyl, 2-chloroethyl, 3-chloropropyl, 2-chloropropyl, 1-chloropropyl, hydroxymethyl, 2-hydroxyethyl, 3-hydroxypropyl, 2-hydroxypropyl, methoxymethyl, 2-methoxyethyl, 3-methoxypropyl and 2-methoxypropyl. The halogen substitutents may be fluorine, chlorine or bromine.

The following are mentioned as specific examples of compounds of formulae (I) and (II): N-methylpropiolactam, N-ethylpropiolactam, N-isopropylpropiolactam, N-butylpropiolactam, N-chloromethylpropiolactam, N-2-chloroethylpropiolactam, N-2-hydroxyethylpropiolactam, N-3-hydroxypropyl propiolactam, N-2-hydroxypropiolactam and N-2-methoxyethylpropiolactam; N-methylpyrrolidone, N-ethylpyrrolidone, N-isopropylpyrrolidone, N-butylpyrrolidone, N-chloromethylpyrrolidone, N-2-chloroethylpyrrolidone, N-2-hydroxyethylpyrrolidone, N-3-hydroxypropylpyrrolidone, N-2-hydroxy-propyl-pyrrolidone, N-2-methoxyethylpyrrolidone, N-methylvalerolactam, N-ethylvalerolactam, N-iso-propylvalerolactam, N-butylvalerolactam, N-chloromethylvalerolactam, N-2-chloroethylvalerolactam, N-2-hydroxyethylvalerolactam, N-3-hydroxypropylvalerolactam, N-2-hydroxyvalerolactam, N-2-methoxyethylvalerolactam;

N-acetylacetidine, N-propionylacetidine, N-chloroacetylacetidine, N-hydroxyacetylacetidine, N-methoxyacetylacetidine;

N-acetylpyrrolidine, N-propionylpyrrolidine, N-chloroacetylpyrrolidine, N-hydroxyacetylpyrrolidine, N-methoxyacetylpyrrolidine; and N-acetylpiperidine, N-propionylpiperidine, N-chloroacetylpiperidine, N-hydroxyacetylpiperidine and N-methoxyacetylpiperidine.

The solutions according to the invention preferably contain from 3 to 60 percent of hydrogen peroxide, based on the total weight of the solution. Solutions which contain up to about 35 percent of hydrogen peroxide are particularly preferred. The invention also relates, of course, to solutions of $H_2O_2$ in a mixture of the above mentioned heterocyclic nitrogen compounds, including, for example, both mixtures of compounds of the same type and different structure and mixtures of one or more compounds of one class with one or more compounds of a different class, e.g., one or more lactams of formula (I) with one or more acylated heterocyclic compounds of formula (II).

The invention also relates to processes for the preparation of stable, anhydrous solutions of hydrogen peroxide, wherein saturated heterocyclic compounds which have 4 to 6 ring members and which contain a nitrogen hetero atom and a carbonyl group adjacent to the hetero atom are added to aqueous hydrogen peroxide solutions and water is then removed in conventional manner.

The starting material for the process according to the invention may be aqueous hydrogen peroxide of any concentration. Aqueous hydrogen peroxide solutions containing about 2.5 to 50 percent $H_2O$ and preferably about 3 to 35 percent $H_2O_2$ are generally used.

Suitable heterocyclic nitrogen compounds for the process according to the invention are, for example, the compounds of the general formulae (I) and (II) already mentioned above. The process may, of course, also be carried out with mixtures of various compounds of the type mentioned above which all contain a nitrogen atom in the heterocyclic ring but which differ from each other in their structure, for example a mixture of several lactams which differ in their structure or one or more lactams mixed with one or more acylated heterocyclic compounds which contain nitrogen as the hetero atom. The different compounds should be used in such proportions that the physical properties of the mixture allow for the most advantageous working up of the reaction products. If mixtures are used, it is preferred to use such mixtures which by virtue of their solubility and boiling point afford some advantage over the use of only one heterocyclic compound.

The quantity of the heterocyclic nitrogen compound or mixture of heterocyclic nitrogen compounds added according to the invention to the aqueous hydrogen peroxide solution may be varied within wide limits and will depend, of course, on the $H_2O_2$ content desired in the anhydrous solution produced. If, for example, an anhydrous 30 percent hydrogen peroxide solution is to be prepared from an aqueous 30 percent hydrogen peroxide solution, the heterocyclic compounds may be added in an amount of about 70 percent by weight based on the total weight of the solution before the water is removed. When choosing the proportion of heterocyclic compounds to aqueous hydrogen peroxide solution it is, of course, necessary to take into account the physical properties of the heterocyclic compound or mixture of compounds and in particular the solubility properties such as the miscibility with the aqueous hydrogen peroxide solution.

Removal of water for preparing the solutions according to the invention is carried out by known methods, generally by distillation, preferably at reduced pressure, although dehydration may also be carried out by freezing the water or by binding the water to a dehydrating agent. For removing the water by distillation, inert vehicles may be added, e.g., benzene, toluene, xylene, methyl acetate, ethyl acetate, butyl acetate, amyl acetate, ethyl propionate, methylene chloride, or the like. Dehydration may also be effected by azeotropic distillation with the addition of the solvents commonly used for azeotropic distillations. The vehicles may be added in amounts of from about 30 to 300 percent by weight, based on the amount of water present.

The process according to the invention is generally carried out by first adding the heterocyclic compound or mixture of compounds to the aqueous hydrogen peroxide solution and then distilling off the water. Alternatively, the solvent may be added continuously during the distillation process until all the water has been removed and the desired end concentration of hydrogen peroxide has been obtained. For example, the solution may be dehydrated and adjusted to the desired end concentration of $H_2O_2$ at the same time. It is generally advantageous to distill off the water at a reduced pressure, e.g., at a pressure below about 400 mm Hg and preferably in the range of from about 20 to 100 mm Hg.

According to a preferred method of carrying out the process according to the invention, most of the water is first distilled off under vacuum and the residual water is then removed with one of the usual vehicles. If small quantities of $H_2O_2$ are distilled off with the vehicle in this stage of final dehydration, this portion of the distillate may be returned to the process according to the invention, especially if the preparation of anhydrous hydrogen peroxide solutions by the process according to the invention is carried out continuously. On a technical scale, the process may be carried out with any conventional apparatus such as column with filling bodies, plate columns or thin layer evaporators. Glass or enamelled vessels or vessels coated with plastics may be used or the process may be carried out in carefully passivated refined steel apparatus.

The advantage of the process according to the invention over the previous processes for the separation of $H_2O_2$ and $H_2O$ is that non-aqueous hydrogen peroxide solutions can now be prepared safely and without loss and with considerably less expenditure in distillation.

The invention is illustrated by the following example.

EXAMPLE 75 g of N-methylpyrrolidone are added all at once to a solution of 36.0 g of $H_2O_2$ in 560 g of $H_2O$, and 548 g of H2O containing 0.19 percent of $H_2O_2$ are distilled off at a pressure of 24 mm Hg in a glass column containing polyethylene filling bodies, 113.5 g of distillation residue containing 30.8 percent of $H_2O_2$ being obtained.

It will be appreciated that the instant specification and examples are set forth by way of illustration and not limitation and that various modifications and changes may be made without departing from the spirit and scope of the present invention.

What is claimed is:

1. An anhydrous solution of hydrogen peroxide in at least one saturated nitrogen heterocyclic compound having from 4 to 6 ring members, a single heterocyclic nitrogen atom and a carbonyl group adjacent to the nitrogen hetero atom, the solution comprising up to about 60 percent by weight of hydrogen peroxide based on the total weight of the solution.

2. A solution as claimed in claim 1, wherein the carbon atom of the carbonyl group is a member of the heterocyclic ring.

3. A solution as claimed in claim 1, wherein the carbonyl group is outside the heterocyclic ring.

4. A solution as claimed in claim 2, wherein the heterocyclic compound is a lactam with the general formula (I):

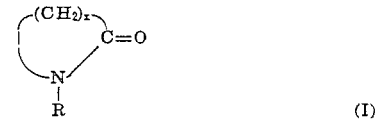

in which

R represents a straight chain or branched $C_1$–$C_4$ alkyl radical which may be substituted with one or more of halogen, hydroxy or a $C_1$ to $C_3$ alkoxy group; and $x$ represents the integer 2, 3 or 4.

5. A solution as claimed in claim 3 wherein the heterocyclic compound is a lactam with the general formula (II):

in which $y$ represents the integer 3, 4 or 5; and

R represents a straight chained or branched $C_1$ to $C_4$ alkyl radical which may be sustituted with one or more of halogen, hydroxy or a $C_1$ to $C_3$ alkoxy group.

6. A solution as claimed in claim 1, wherein the solution comprises from about 3 to 60 percent by weight of hydrogen peroxide based on the total weight of the solution.

7. A solution as claimed in claim 6, which comprises up to 35 percent by weight of hydrogen peroxide based on the total weight of the solution.

8. A process for the preparation of a substantially anhydrous solution of hydrogen peroxide, which comprises adding at least one saturated nitrogen heterocyclic compound having 4 to 6 ring members, a single heterocyclic nitrogen atom and a carbonyl group in a position adjacent to the nitrogen hetero atom to an aqueous hydrogen peroxide solution, the nitrogen compound being added in an amount comprising at least about 40 percent by weight of the hydrogen peroxide plus nitrogen compound, and then removing the water.

9. A process as claimed in claim 8, wherein the heterocyclic compound is a lactam of general formula (I)

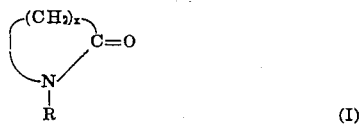

(I)

in which

R represents a straight chain or branched $C_1$–$C_4$ alkyl radical which may be substituted with one or more of halogen, hydroxy or a $C_1$ to $C_3$ alkoxy group; and $x$ represents the integer 2, 3 or 4.

10. A process as claimed in claim 8, wherein the heterocyclic compound is a lactam of general formula (II)

(II)

in which $y$ represents the integer 3, 4 or 5; and

R represents a straight chained or branched $C_1$ to $C_4$ alkyl radical which may be substituted with one or more of halogen, hydroxy or a $C_1$ to $C_3$ alkoxy group.

11. A process as claimed in claim 8, wherein aqueous hydrogen peroxide solutions which contain 2.5 to 50 percent by weight of $H_2O_2$ are used.

12. A process as claimed in claim 8, wherein the water is removed by vacuum distillation.

13. A process as claimed in claim 12, wherein a vehicle is added for the removal of water.

14. A process as claimed in claim 13, wherein the vehicle is used in a quantity of from about 30 to 300 percent by weight, based on the quantity of the water present.

* * * * *